June 28, 1927.
N. A. CHRISTENSEN
AUTOMOTIVE COMPRESSOR
Filed Aug. 3, 1925  2 Sheets-Sheet 1
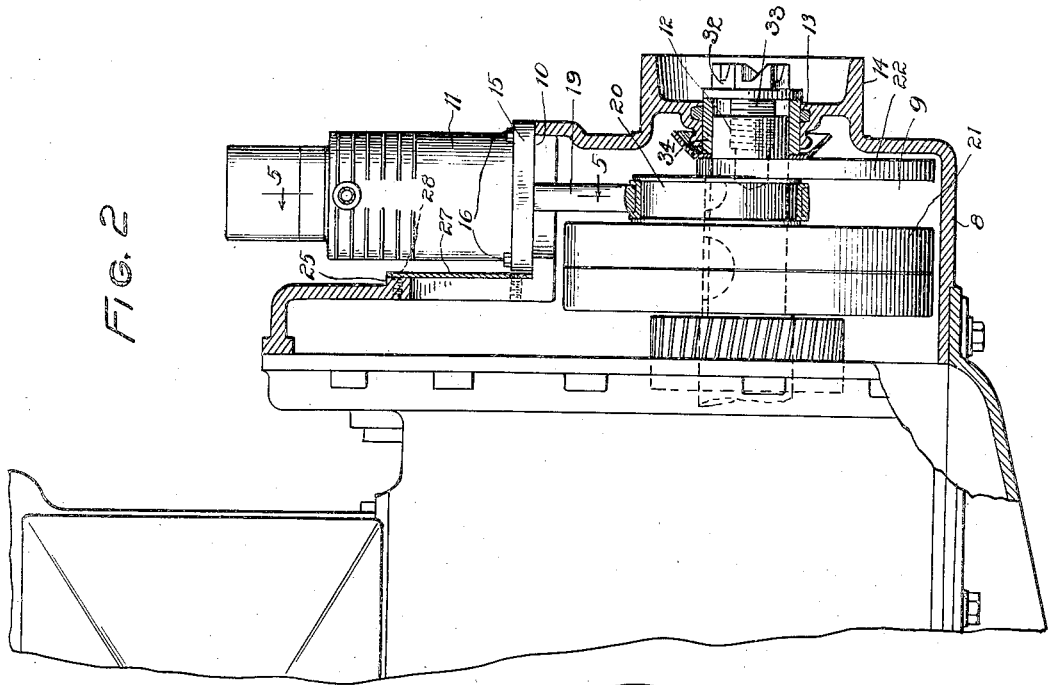
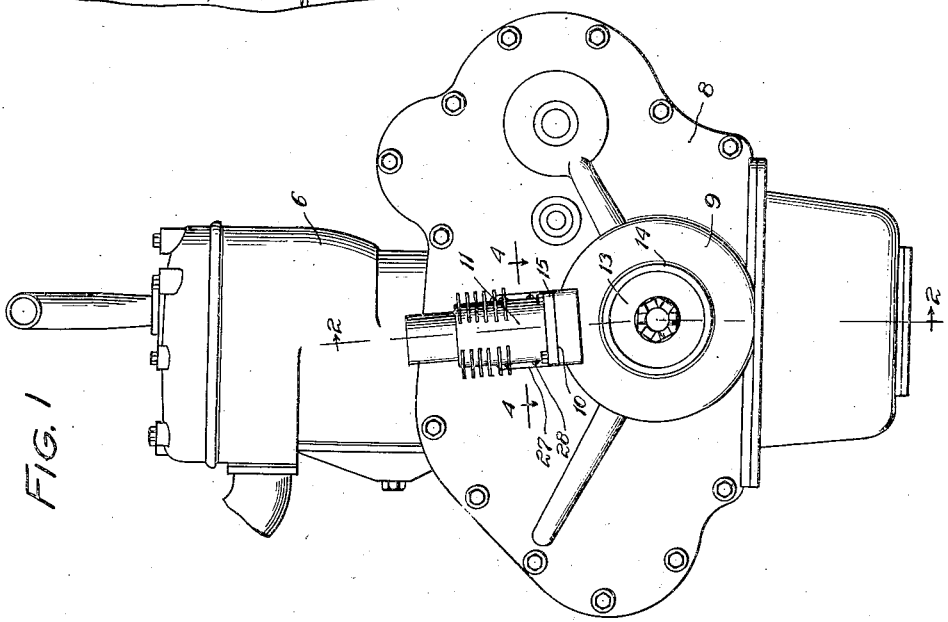

June 28, 1927.
N. A. CHRISTENSEN
AUTOMOTIVE COMPRESSOR
Filed Aug. 3, 1925      2 Sheets-Sheet 2
1,633,764
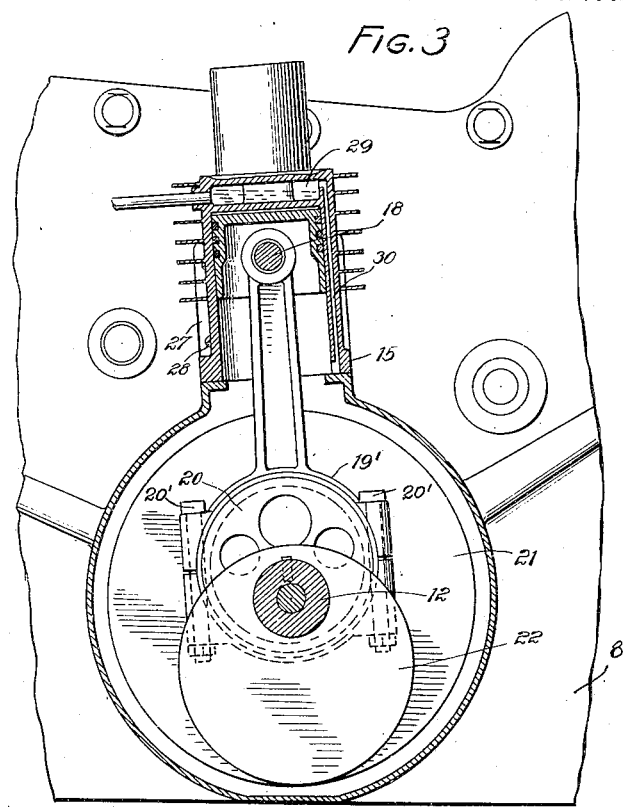
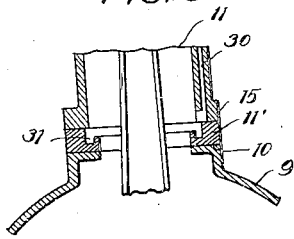
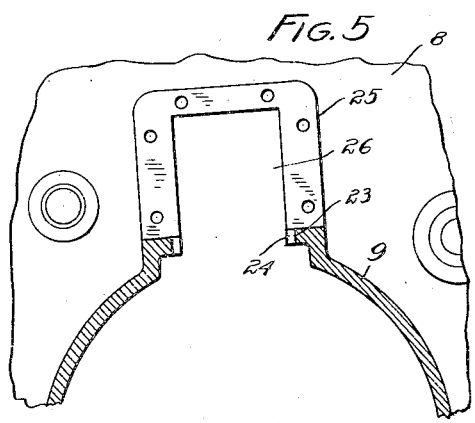
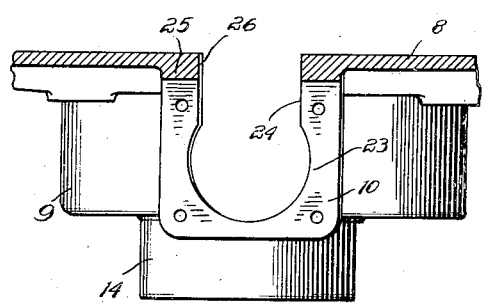

Patented June 28, 1927.

1,633,764

UNITED STATES PATENT OFFICE.

NIELS A. CHRISTENSEN, OF MILWAUKEE, WISCONSIN.

AUTOMOTIVE COMPRESSOR.

Application filed August 3, 1925. Serial No. 47,933.

The invention relates to compressors, and more particularly to compressors for the air brake equipment of automotive vehicles.

Heretofore it has been the general practice to mount the compressor adjacent the engine and drive the same from auxiliary shafting associated with the engine, such as the magneto drive shaft, the compressor being a separate unit. The object of this invention is to provide a compressor in which the crank case is formed by the front or gear cover plate of the engine, with a provision for inspecting the bearings of the compressor upon removal of the compressor cylinder and said cover plate, whereby the compressor may be readily associated with the engines now in use by the substitution of a cover plate embodying the invention, and whereby the engines of new design may be readily equipped with the compressor unit.

The invention further consists in the several features hereinafter set forth and more particularly defined by claims at the conclusion hereof.

In the drawings: Fig. 1 is a front elevation view of an automotive engine equipped with the apparatus embodying the invention;

Fig. 2 is a detail sectional view taken on the line 2—2 of Fig. 1;

Fig. 3 is an elevation view of the gear or front cover plate with parts of the compressor and cover plate shown in section;

Fig. 4 is a detail sectional view taken on the line 4—4 of Fig. 1;

Fig. 5 is a detail sectional view taken on the line 5—5 of Fig. 2;

Fig. 6 is a detail sectional view of a portion of the compressor showing the incorporation of a lubricating trough.

In the drawings the numeral 6 designates an internal combustion engine of automotive type, in which the timing gears for the cam shaft drive and other gears for the generator drive and the fan are mounted at the front end of the crank case 7 of the engine, within a housing formed by the engine crank case and a front cover plate. According to the present invention, the front cover plate 8 is specially designed to form the crank case 9 of the compressor and has a mounting pad or portion 10 formed thereon to support the cylinder 11 of the compressor. The front end 12 of the crank shaft of the engine extends through the housing or crank case 10 into a recess 13 in the front trunnion bearing 14 of the engine. It will, of course, be understood that the main front bearing for the crank shaft is within the engine crank case proper adjacent the front cover plate. The cylinder 11 of the compressor has a flanged base 15 provided with holes to take the bolts 16 that extend into the pad 10 of the cover plate. The cylinder may be bolted down directly to this pad or bolted thereto with a lubricating trough fitting 11′, as shown in Fig. 6.

A piston 17 works in the cylinder of the compressor and is operatively connected to the front end of the crank shaft 12 by means of a wrist-pin 18 and connecting-rod 19, with its adjustable big end bearing 19′, whose valves are formed as an eccentric strap to fit over and be secured in operative position by the bolts 20′ upon the eccentric 20 keyed to the crank shaft adjacent a balancer 21, where such is provided, the eccentric having a counterbalance weight 22 associated therewith.

The inlet and exhaust valves of the compressor are not shown in detail, but may be of any suitable construction.

The pad portion 10 of the gear housing has a bore 23 formed therein communicating with the crank case 9 and a slot 24. The side 25 of the cover plate extends upwardly at an angle to the pad portion 10 and the slot 24 at its rear end is alined with and merges into an opening 26 in the part 25. The base 15 of the compressor cylinder, or the fitting 11 with which the box may be associated, covers the opening 23 and extends into a position adjacent the vertical wall 25, and a plate 27 secured by screws 28 covers the opening 26 when the compressor is assembled.

With this construction the piston 17 of the compressor is driven by a crank shaft 12 of the engine to compress air in the cylinder and expel it to the reservoir. As the cylinder is removable independent of the cover plate, the rings and wrist-pin may be readily inspected or renewed when desired, by taking off the cylinder 11. In case any adjustment or renewal of the big end bearing 19′ of the connecting-rod 19 is necessary, the removal of the cylinder 11, and the fitting 11′, when used, and the removal of the cover plate 27 permits the taking off or partial removal of the main gear or cover plate 8, by an endwise movement of said plate 7 toward the front end of the crank shaft and thus permit ready access to said big end bearing, and adjustment of said big end bearing may be made while the connecting-rod is assembled to said crank shaft.

Inasmuch as the crank case 9 of the compressor is an extension of the main crank case of the motor, the lubricating system for the compressor may use the same lubricating oil as the motor, and the oil dripping or coming down from the walls of the compressor cylinder below the piston will serve to oil the big end of the connecting-rod and find its way into the crank case of the motor, and return to the main oil sump of the engine. As shown, the cylinder head of the compressor has a cooling space 29 into which the lubricating oil of the main engine is forced and from which the oil flows through a passage 30 into the lower end of the cylinder and then to the crank case 9. In some instances a trough 31, supplied with oil from the passage 30, is formed in the member 11 and the lower end of the piston dips into this trough so as to oil the cylinder walls, the oil overflowing from said trough to the crank case. A starter claw 32 has a threaded shank 33 engaging in a threaded bore in the shaft 12 and associated with a sleeve 34 which bears against the eccentric 20 shown in Fig. 2 as keyed to the shaft 12 and held by said claw 34 between the balancer 21 and the sleeve 34 against longitudinal movement. The features of cooling the head and lubricating the cylinder are more particularly described and claimed in my copending application for compressor or motor, Ser. No. 720,782, filed June 18, 1924.

I desire it to be understood that this invention is not to be limited to any specific form or arrangement of parts except in so far as such limitations are specified in the claims or necessitated by the prior art.

What I claim as my invention is:

1. In an automotive engine, the combination of a front cover plate forming a closure for the front end of the engine crank case having a forwardly extending compressor crank case portion, an engine crank shaft extending into such portion, said cover plate having a cylinder-supporting portion, an air compressor cylinder mounted on said cylinder-supporting portion, a piston working in said cylinder, a crank member within said compressor crank case mounted directly on and continuously driven by said crank shaft, and a driving connection between said piston and said crank member.

2. In an automotive engine, a removable front cover plate having a compressor crank case portion into which a shaft of the engine extends, said cover plate also having a compressor-cylinder-supporting portion, a cylinder removably mounted on said supporting portion, a piston working in said cylinder, a driving connection between said piston and that portion of said shaft extending into said crank case, said supporting portion having an opening to accommodate the driving connection between the piston and crank shaft and to permit the removal of said cover plate upon the removal of said cylinder without disconnecting said driving connection.

3. In an automotive engine, the combination of a detachable front cover plate having a part forming the crank case of an air compressor, a compressor-cylinder-supporting portion and a wall adjacent the cylinder, a compressor cylinder associated with said cylinder-supporting portion, a piston working in said cylinder, a drive shaft, and a driving connection between said shaft and said piston including a connecting-rod, said cylinder-support portion and said wall being slotted to permit movement of said cover plate to a position for inspection of the main bearing of said connecting rod without removing said connecting-rod.

4. In an automotive engine, the combination of a removable front cover plate having a compressor crank case portion, said cover plate having a compressor-cylinder-supporting portion, a compressor cylinder removably mounted on said supporting portion, a piston working in said cylinder, an engine-driven shaft, a driving connection between said piston and said shaft including a connecting-rod having an adjustable big end bearing associated with said shaft, said cover plate being so constructed and arranged as to permit its removal for adjustment or inspection of said big end bearing while said bearing is associated with said shaft.

5. In an automotive engine, the combination of a detachable front cover plate having a part forming the crank case of an air compressor and also having a cylinder-supporting portion for said compressor and an engine trunnion bearing portion at the front end of said compressor crank case portion, an air compressor cylinder mounted on said cylinder-supporting portion, a piston working in said cylinder, and a direct driving connection between said piston and the crank shaft of the engine.

6. In an automotive engine, the combination of a detachable front cover plate having a part forming the crank case of an air compressor, and also having a cylinder-supporting portion for said compressor and an engine trunnion bearing portion projecting from the front end of said compressor crank case, the crank shaft of the engine extending into said compressor crank case portion, an air compressor cylinder mounted on said cylinder-supporting portion, a piston working in said cylinder, an eccentric mounted on said crank shaft within said crank case, a starter claw associated with said eccentric to prevent longitudinal movement thereof, and a connecting-rod operatively connecting said piston and said eccentric.

7. In an automotive engine, the combination with the engine crank shaft and the main crank case of the engine, of a front cover plate detachably secured to the crank case of the engine and having a compressor crank case portion and a trunnion bearing portion projecting from said compressor crank case portion, and compressor drive means within said cover plate including an eccentric associated with said crank shaft adjacent said trunnion bearing portion.

8. In an automotive engine, the combination with the engine crank shaft and the main crank case of the engine, of a front cover plate detachably secured to the crank case of the engine and having a compressor crank case portion and a trunnion bearing portion at the front end of said compressor crank case, said crank shaft having a threaded end, compressor drive means including an eccentric mounted on said crank shaft adjacent said trunnion bearing portion, and a member having a threaded shank engaging the threaded end of said crank shaft and associated with said eccentric to hold it against longitudinal movement.

In testimony whereof, I affix my signature.

NIELS A. CHRISTENSEN.